(12) United States Patent
Kaneko et al.

(10) Patent No.: US 10,865,900 B2
(45) Date of Patent: Dec. 15, 2020

(54) VALVE UNIT FIXING STRUCTURE AND FLUID PUMP USING THE SAME

(71) Applicant: KEIHIN CORPORATION, Shinjuku-ku, Tokyo (JP)

(72) Inventors: Yohei Kaneko, Tochigi (JP); Yuya Ogane, Tochigi (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 16/361,999

(22) Filed: Mar. 22, 2019

(65) Prior Publication Data

US 2019/0301626 A1 Oct. 3, 2019

(30) Foreign Application Priority Data

Mar. 27, 2018 (JP) ................. 2018-059719
Mar. 27, 2018 (JP) ................. 2018-059720

(51) Int. Cl.
*B23K 1/00* (2006.01)
*F16K 27/02* (2006.01)
*F16K 17/04* (2006.01)
*F16K 15/02* (2006.01)
*F16K 25/00* (2006.01)

(52) U.S. Cl.
CPC ........ *F16K 17/0406* (2013.01); *F16K 15/025* (2013.01); *F16K 27/0209* (2013.01); *B23K 1/0006* (2013.01); *F16K 25/00* (2013.01)

(58) Field of Classification Search
CPC ............... F16K 17/0406; F16K 15/025; F16K 27/0209; Y10T 137/6086
See application file for complete search history.

(56) References Cited

U.S. PATENT DOCUMENTS

| | | | |
|---|---|---|---|
| 6,679,684 B2 * | 1/2004 | Kominami | B60T 8/4031 417/214 |
| 6,792,968 B1 * | 9/2004 | Breeden | F02M 59/105 123/506 |
| 8,147,226 B2 * | 4/2012 | Koka | B08B 3/026 137/512 |
| 2007/0137711 A1 * | 6/2007 | Krebs | F16K 15/025 137/454.5 |
| 2015/0219235 A1 * | 8/2015 | Lildholdt | F16K 27/067 251/304 |

FOREIGN PATENT DOCUMENTS

| JP | 2004-138062 A | 5/2004 |
|---|---|---|
| JP | 2011-080391 A | 4/2011 |

* cited by examiner

*Primary Examiner* — Kevin R Barss
(74) *Attorney, Agent, or Firm* — Carrier Blackman & Associates, P.C.; Joseph P. Carrier; Fulchand P. Shende

(57) ABSTRACT

The present invention provides an inexpensive valve unit fixing structure that enables a valve unit to be easily fixed without the need for unitization in advance, and a fluid pump that enables a discharge valve and a relief valve to be incorporated in a compact manner. The valve unit fixing structure includes a main body (3), a discharge communication passage (9) provided inside the main body (3), a discharge valve unit (10) which is provided in the main body (3) and which opens/closes the discharge communication passage (9), and deformed fixing parts (35) which are formed by plastically deforming the main body (3) and which fix the discharge valve unit (10) to the main body (3).

8 Claims, 6 Drawing Sheets

VALVE UNIT FIXING STRUCTURE AND FLUID PUMP USING THE SAME

BACKGROUND OF THE INVENTION

1. Field of the Invention

The present invention relates to a valve unit fixing structure in which a valve unit is fixed to a main body, and a fluid pump using the same.

2. Description of the Related Art

Hitherto, there has been known a valve unit fixing structure that includes a valve unit and a main body to which the valve unit is fixed (refer to, for example, Patent Documents 1 and 2). The main body includes a main body flow passage which is provided inside the main body and through which a fluid passes, and a recess having the bottom part thereof in communication with the main body flow passage. The valve unit includes a valve seat section having a valve seat, a valve body which comes in contact with the valve seat to close the main body flow passage, a spring member which urges the valve body toward the valve seat section, and a holder which accommodates the spring member.

According to the valve unit fixing structure described in Patent Document 1, the valve seat section, the valve body, the spring member and the holder of a discharge valve unit are assembled outside the main body, and the valve seat section and the holder are laser-welded into a unit before being press-fitted into the recess of the main body, thereby fixing the unitized valve seat section and the holder.

According to the valve unit fixing structure described in Patent Document 2 also, a valve seat section and a holder are considered to be unitized and then press-fitted into a recess in the same manner for some valve units.

Further, there has conventionally been known a high-pressure fuel supply pump that includes a compression chamber for drawing in a fluid, increasing the pressure of the fluid and then discharging the fluid, a pump main body constituting the compression chamber, a high-pressure pipe through which the fluid discharged from the compression chamber passes, and a discharge valve unit provided in a discharge passage extending from the compression chamber to the high-pressure pipe (refer to, for example Patent Documents 1 and 2).

In the high-pressure fuel supply pump described in Patent Document 1, the valve seat member of the discharge valve unit is fixed by being press-fitted to the discharge passage of the pump main body. However, the discharge passage has a high pressure environment therein, and the discharge valve unit must be firmly fixed. For this reason, the discharge valve unit is press-fitted to the discharge passage with a large tightening margin. It is considered that the same is applied to the high-pressure fuel supply pump described in Patent Document 2.

Further, the high-pressure fuel supply pump described in Patent Document 2 includes a pressure limiting valve acting as a relief valve to avoid an excessive pressure in a fuel collector line, which may impair the normal function of an injector (fuel injection valve) in the case where a quantity control valve fails.

Patent Document 1: Japanese Patent Application Laid-Open No. 2011-80391

Patent Document 2: Japanese Patent Application Laid-Open No. 2004-138062

However, according to the foregoing valve unit fixing structures described in Patent Documents 1 and 2, the unitization is performed by welding or the like before the units are fixed to the recesses of the main bodies, thus requiring time and effort for welding or the like or a step for controlling the deformation amount after welding. These steps interfere with the supply of inexpensive valve unit fixing structures.

Further, in general, the valve seat section is subjected to heat treatment to enhance the hardness thereof, and the holder is formed of a material with lower hardness to make the forming easy. Thus, the welding between the valve seat section and the holder is the welding between different types of materials, leading to a greater difficulty of welding.

Further, according to the foregoing high-pressure fuel supply pump described in Patent Documents 1 and 2, the valve seat member of the discharge valve unit is press-fitted to the discharge passage with a large tightening margin, so that a relatively large distortion occurs at the circumferential part of the discharge passage in the pump main body.

Therefore, in the case where a relief valve with a valve opening pressure that has been adjusted with high accuracy is provided in the pump main body, considerations must be given, such as placing a pressure regulating valve at a position away from the discharge passage so as to prevent the distortion from exerting influences on the pressure regulating valve. This limits the layout when installing the discharge valve, the relief valve and the like, thus interfering with reducing the size of the pump.

SUMMARY OF THE INVENTION

In view of the problems with the prior art described above, an object of the present invention is to provide an inexpensive valve unit fixing structure that enables a valve unit to be easily fixed without the need for unitization in advance, and a fluid pump that enables a discharge valve and a relief valve to be mounted in a compact manner.

To this end, a valve unit fixing structure in accordance with the present invention is a valve unit fixing mechanism including:

a main body;

a main body flow passage which is provided in the main body and through which a fluid passes;

a valve unit which is provided in the main body and which opens/closes the main body flow passage, and a deformed fixing part which is formed by plastically deforming the main body and which fixes the valve unit to the main body.

According to a further specific mode of the present invention, the main body includes a recess which is in communication with the main body flow passage and which extends in a reference direction, the valve unit includes:

a valve seat section having a valve seat;

a valve body which comes in contact with the valve seat to close the main body flow passage;

a spring member which urges the valve body toward the valve seat section; and a holder which accommodates the spring member, wherein the valve unit is fixed to the main body by at least a part of the valve unit being inserted in the recess in the reference direction, the valve seat section includes:

a valve seat contact part which comes in contact with the main body in the reference direction; and a valve seat load receiving part which receives load in the reference direction applied by the holder which comes in contact therewith, the holder applying the load to the valve seat section, the holder includes:

a holder contact part which comes in contact with the valve seat load receiving part; and a holder load receiving part which receives load in the reference direction applied by the main body to the holder, and the deformed fixing part fixes the valve unit to the main body by applying the load in the reference direction to the holder.

According to the present invention, the load in the reference direction applied by the deformed fixing part to the holder is supported by the bottom part of the recess through the holder load receiving part, the holder contact part, the valve seat load receiving part and the valve seat contact part. In other words, the valve unit inserted in the recess remains fixed to the main body while the form of the valve unit is maintained by the deformed fixing part and the recess of the main body.

Thus, the valve unit can be utilized and fixed to the main body at the same time merely by inserting the valve seat section, the valve body, the spring member, and the holder into the recess and by providing the deformed fixing part (by crimping), without the need for unitization by welding or the like in advance.

Further, even in the case where the valve seat section, the valve body, the spring member and the holder are unitized in advance and then the valve unit is fixed to the main body, the form of the valve unit after the installation to the main body is maintained by the deformed fixing part. Hence, even if the valve seat section, the valve body, the spring member and the holder are unitized in advance, the fixing structure can be simplified.

Hence, it is possible to provide an inexpensive valve unit fixing structure that enables a valve unit to be easily fixed to a main body with reduced man-hours. Further, since the valve unit does not have to be press-fitted to a recess of the main body, there is no need for high dimensional accuracy for controlling the tightening margin required for press-fitting.

In a preferred mode of the present invention, the valve seat section includes a substantially cylindrical valve seat inner wall surface which forms at least a part of an inner flow passage which is connected to the main body flow passage and through which the fluid passes, the recess includes:

a recess inner wall surface which extends in parallel to the reference direction;

a flow passage opening which is a part in which the main body flow passage opens to the recess; and a main body contact surface that extends from the flow passage opening to an end edge of the recess inner wall surface, the end edge being adjacent to the flow passage opening, the valve seat contact part is in contact with the main body contact surface, a range in which the valve seat contact part is projected onto a projection plane that is orthogonal to the reference direction is included in a range in which the main body contact surface is projected onto the projection plane, and the valve seat contact part is formed in an annular shape that encloses the entire circumference of the flow passage opening.

With this arrangement, the load applied by the deformed fixing part to the holder so as to fix the valve unit to the main body is concentrated onto the valve seat contact part, which has the annular shape. Hence, even if the surface of the valve seat contact part and the main body contact surface that comes in contact therewith have high surface roughness, the microscopic asperities of the surfaces are smoothed out, thus making it possible to maintain high sealability between the valve seat section and the main body.

In this case, preferably, the holder includes a substantially cylindrical inner circumferential surface, and the valve seat section includes a radial load receiving part which comes in contact with the inner circumferential surface and receives load applied to the valve seat section by the inner circumferential surface in a direction that is orthogonal to the reference direction.

With this arrangement, the radial load that is generated when the valve unit is fixed (fixed by crimping) by the deformed fixing part and which is applied by the deformed fixing part to the holder load receiving part can be received by the radial load receiving part of the valve seat section. This enables the holder to be formed to have a thinner wall, thus making it possible to achieve a smaller, lighter-weight valve unit fixing structure.

Further, in the present invention, preferably, at least a part of the range in which the valve seat contact part is projected onto a projection plane that is orthogonal to the reference direction is included in a range in which the valve seat load receiving part is projected onto the projection plane, and the valve seat surface of the valve seat section that comes in contact with the valve body and the main body contact surface where the main body comes in contact with the valve seat contact part are both formed as the surfaces on planes that are substantially orthogonal to the reference direction.

With this arrangement, the load applied to the valve seat load receiving part is linearly transmitted to the valve seat contact part, thus minimizing the possibility of the occurrence of a bending stress inside the valve seat section. This makes it possible to maintain the accuracy of the valve seat surface of the valve seat section and to keep the flatness of the valve body which comes in contact with the valve seat surface.

By using the valve unit fixing structure described above, a fluid pump that enables a discharge valve and a relief valve to be installed in a compact manner can be provided.

More specifically, the fluid pump in accordance with the present invention is a fluid pump including:

a pump main body having a compression chamber for drawing in a fluid, increasing the pressure of the fluid and then discharging the fluid, the pump main body being provided with a plurality of fluid valves, a high-pressure passage through which a fluid discharged from the compression chamber passes, and a discharge communication passage extending from the compression chamber to the high-pressure passage;

the foregoing valve unit fixing structure according to the present invention, wherein the main body of the valve unit fixing structure constitutes the pump main body, the main body flow passage of the valve unit fixing structure constitutes the discharge passage, at least one of the fluid valves is a discharge valve provided in the discharge communication passage as a valve unit of the valve unit fixing structure, at least another one of the fluid valves is a relief valve provided between the high-pressure passage and a space having a lower pressure than the high-pressure passage, the discharge valve is fixed to the pump main body by the deformed fixing part of the valve unit fixing structure, the deformed fixing part is evenly disposed about the discharge valve at a plurality of places in the circumferential direction, and a non-deformed part, which is a part between the deformed fixing parts that are adjacent to each other in the pump main body, intersects, on the relief valve side than the discharge valve, with a valve placement direction plane which passes through the center of the discharge valve and the center of the relief valve and which is parallel to a direction in which the discharge communication passage extends.

According to the fluid pump in accordance with the present invention, the deformed fixing part formed by plastically deforming the pump main body does not intersect with the foregoing valve placement direction plane on the relief valve side than the discharge valve. Hence, the shortest distance between the deformed fixing part and the relief valve is larger than that in the case where there is the intersection. This makes it possible to prevent, to a maximum extent, the distortion that has occurred in the pump main body due to the formation of the deformed fixing part from being transmitted to the relief valve. Accordingly, the discharge valve and the relief valve can be placed near each other, thus enabling the fluid pump to be made smaller.

In the fluid pump in accordance with the present invention, the pump main body may be provided with a single recess which has a substantially cylindrical inner wall surface and which forms at least a part of the high-pressure passage, and the discharge valve and the relief valve may be inserted through the interior enclosed by the inner wall surface of the recess and fixed to the pump main body.

In this arrangement, the discharge valve and the relief valve are inserted through the interior of the single recess. In this case also, the distortion of the pump main body caused by the formation of the deformed fixing part can be prevented from being transmitted to the relief valve by the effects of the fluid pump. Hence, the distance between the discharge valve and the relief valve can be reduced, so that the recess can be made smaller, thus enabling the pump main body to be made smaller.

In this case, preferably, the plurality of deformed fixing parts are plane-symmetrical, using the valve placement direction plane as the plane of symmetry, and the non-deformed part intersects with the valve placement direction plane also on the opposite side than the discharge valve with respect to the relief valve.

In this configuration, if the discharge valve were brought closest possible to the inner wall surface of the recess, then it would be extremely difficult to plastically deform an area where the inner wall surface of the recess and the discharge valve are close to each other. In this respect, according to the configuration, the non-deformed part intersects with the valve placement direction plane also on the opposite side than the discharge valve with respect to the relief valve, so that placing the opposite side close to the inner wall surface of the recess eliminates the need for plastically deforming the close portion of the recess.

Thus, the discharge valve can be fixed to the pump main body in good balance without the need for plastically deforming the close portion. This makes it possible to insert the relief valve and the like through the interior of the small recess and to place the relief valve and the like, so that a further reduction of the size of the fluid pump can be achieved.

In the fluid pump in accordance with the present invention, preferably, the pump main body is provided with a relief passage in communication with the low-pressure space from the high-pressure passage, and the relief valve includes:

a valve body;

a valve seat member which is press-fitted into the relief passage and which collaborates with the valve body, and a spring member which is inserted in the relief passage and compressed by press-fitting of the valve seat member and which urges the valve body toward the valve seat member.

This arrangement minimizes the possibility of the transmission of the distortion attributable to the formation of the deformed fixing part to a relief passage, i.e. the relief valve, as described above. Hence, even if the valve seat member of the relief valve is directly press-fitted into the relief passage of the pump main body to fix the valve seat member, the bearing surface of the valve seat member will not be distorted.

Thus, the sealability between the valve body and the bearing surface can be maintained without the need for any other components, making it possible to reduce the number of components. Further, since the valve seat member will not be displaced by the distortion of the deformed fixing part, the compression amount of the spring member is prevented from changing, so that the valve opening pressure of the relief valve can be accurately controlled.

DESCRIPTION OF THE PREFERRED EMBODIMENTS

Figure 1:
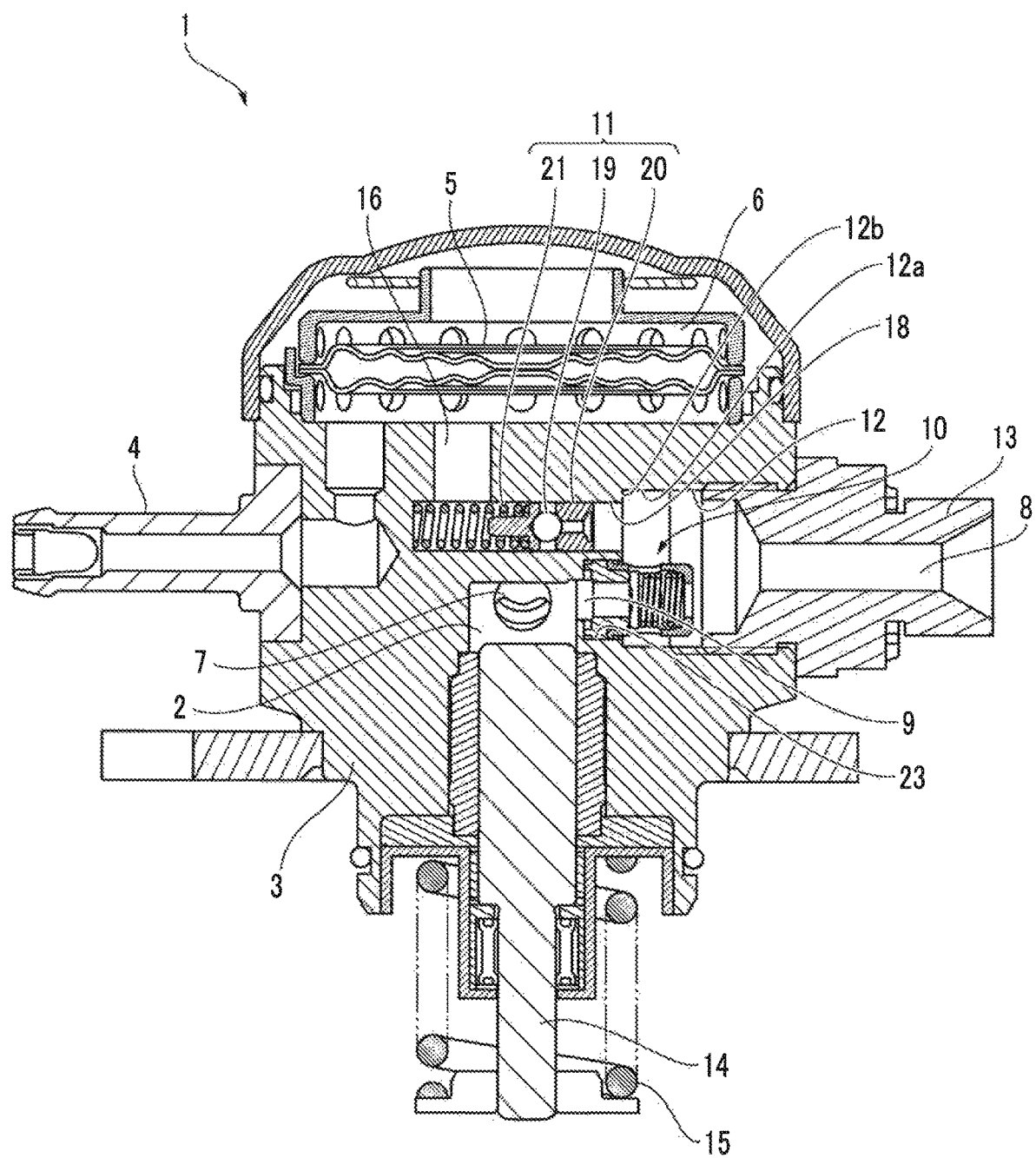
FIG. 1 is a sectional view illustrating an essential section of a high-pressure fuel pump according to an embodiment of the present invention.

The embodiments of the present invention will now be described with reference to the accompanying drawings. FIG. 1 illustrates an essential section of a high-pressure fuel pump in a fuel supply system of a direct-injection engine according to an embodiment of the present invention. The high-pressure fuel pump increases the pressure of a fuel fed from a fuel tank by using the rotative power of an engine cam and supplies the fuel to an injector.

Referring to FIG. 1, a high-pressure fuel pump 1 includes a main body 3 serving as a pump main body having a compression chamber 2. The compression chamber 2 is used to suck in a fuel as a fluid fed from a fuel tank, increase the pressure of the fuel and then discharge the fuel. The fuel is supplied to the compression chamber 2 through a damper chamber 6, in which a pulsation damper 5 is placed, and an intake port 7 from an intake pipe 4 connected to a low-pressure fuel pump of the fuel tank.

The main body 3 is provided with a plurality of fluid valves, a high-pressure passage 8 through which a fuel discharged from the compression chamber 2 passes, and a discharge communication passage 9 which is adjacent to the compression chamber 2 and which extends from the compression chamber 2 to the high-pressure passage 8. The discharge communication passage 9 constitutes a part of a main body flow passage which is provided inside the main body 3 and through which a fluid passes. As one of the plurality of fluid valves, a discharge valve unit 10 constituting a discharge valve, which discharges the fuel pressurized by the compression chamber 2 to the high-pressure passage 8 side, is provided on the downstream side of the discharge communication passage 9.

Further, as another fluid valve, a relief valve 11 which releases a fuel, the pressure of which has become too high, from the high-pressure passage 8 side to a damper chamber 6 side, which is a space having a pressure that is lower than that of the high-pressure passage 8, is provided between the high-pressure passage 8 and the damper chamber 6, which is the space having a pressure that is lower than that of the high-pressure passage 8. Further, although not illustrated, an intake valve (spill valve) that controls the intake of the fuel into the compression chamber 2 is provided on the upstream side of the intake port 7.

The main body 3 is provided with a single large-diameter recess 12 which opens to the outer surface of the main body 3 and which forms at least a part of the high-pressure passage 8. The discharge valve unit 10 and the relief valve 11 are inserted through the interior of the large-diameter recess 12 which is surrounded by an inner wall surface 12a, and fixed to the main body 3.

A high-pressure connection part 13 which constitutes, together with the large-diameter recess 12, a part of the high-pressure passage 8, is coupled to the opening side of the large-diameter recess 12. A part of the high-pressure passage 8 which is in communication with an injector is connected to the high-pressure connection part 13 at an end thereof that is on the opposite side from the large-diameter recess 12.

The lower surface of the compression chamber 2 is constituted of the distal end surface of a plunger 14. The plunger 14 performs reciprocating movement to repeatedly carry out the cycle of the intake of a fuel into the compression chamber 2, the compression of the fuel, and the discharge of the fuel. The reciprocating movement is performed by the urging force of a spring 15 and a cam driven against the urging force by the motive power of an engine crankshaft or the like.

Further, the main body 3 is provided with a relief passage 16 in communication with the damper chamber 6 from the high-pressure passage 8. The relief passage 16 has a passage part 18 which is parallel to a central axis 17 (refer to FIG. 2) of the discharge valve unit 10 and one end of which opens to a bottom surface 12b of the large-diameter recess 12.

The relief valve 11 includes a valve body 19, a valve seat member 20 which is press-fitted into the passage part 18 and which collaborates with the valve body 19, and a spring member 21 which is inserted into the passage part 18 and compressed by the valve seat member 20 being press-fitted so as to urge the valve body 19 toward the valve seat member 20.

Figure 2:
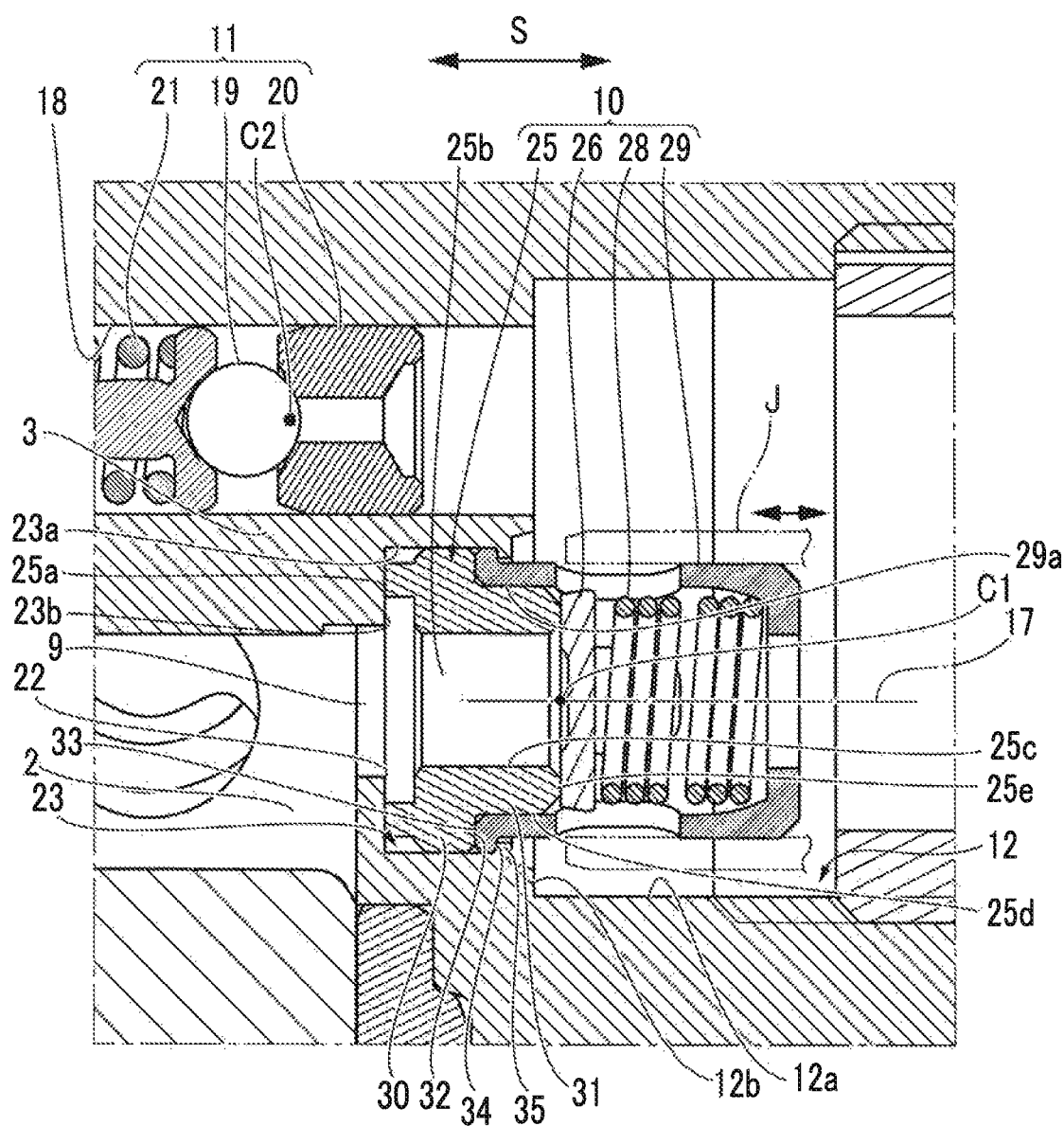
FIG. 2 is a sectional view illustrating the neighborhood of a discharge valve unit in the high-pressure fuel pump of FIG. 1.

FIG. 2 illustrates a section of the discharge valve unit 10. As illustrated in FIG. 2, the upstream side of the discharge communication passage 9 of the main body 3 opens to the compression chamber 2. A small-diameter recess 23, which extends in a reference direction S and which opens to the bottom surface 12b of the large-diameter recess 12, is provided on the large-diameter recess 12 side of the discharge communication passage 9. The downstream side of the discharge communication passage 9 opens to the bottom portion of the small-diameter recess 23.

The discharge valve unit 10 is shaped like a hollow cylinder and includes a valve seat section 25 having a valve seat 25e, a valve body 26 which comes in contact with the valve seat 25e to close the discharge communication passage 9, a spring member 28 which urges the valve body 26 such that the valve body 26 comes in contact with the valve seat 25e, and a holder 29 which accommodates the spring member 28. The inner space of the holder 29 is in communication with the inner space of the large-diameter recess 12. The discharge valve unit 10 is fixed to the main body 3 by at least a part of the discharge valve unit 10 being inserted into the small-diameter recess 23 in the reference direction S.

The valve seat section 25 includes a large-outside-diameter part 30 on the upstream side, a small-outside-diameter part 31 which has an outside diameter that is smaller than that of the large-outside-diameter part 30 and which is on the downstream side, a valve seat load receiving part 32 which connects, in a stepwise manner, the large-outside-diameter part 30 and the small-outside-diameter part 31, and a valve seat contact part 25a which is in contact with the main body 3 in the reference direction S. The valve seat contact part 25a is a part in direct contact with the main body 3, and a part around that part is not included in the valve seat contact part 25a.

Further, the valve seat section 25 includes a substantially cylindrical valve seat inner wall surface 25c which forms at least a part of an inner flow passage 25b which is connected to the discharge communication passage 9 and through which a fluid passes.

The valve seat load receiving part 32 is subjected to a load applied, by the contact thereof with the holder 29, to the valve seat section 25 in the reference direction S parallel to the central axis 17 of the discharge valve unit 10. The valve seat load receiving part 32 is a part in direct contact with the holder 29, and a part around that part is not included in the valve seat load receiving part 32.

The holder 29 includes a holder contact part 33 which is in contact with the valve seat load receiving part 32, and a holder load receiving part 34 which receives a load applied by the main body 3 to the holder 29 in the reference direction S.

The load applied by the main body 3 to the holder 29 in the reference direction S is imparted by deformed fixing parts 35 provided by plastically deforming the main body 3. More specifically, the discharge valve unit 10 inserted in the small-diameter recess 23 of the main body 3 is fixed to the main body 3 by the deformed fixing parts 35.

The small-diameter recess 23 includes a recess inner wall surface 23a which extends in parallel to the reference direction S, a flow passage opening 22 which is a part where the discharge communication passage 9 opens at the bottom of the small-diameter recess 23, and a main body contact surface 23b which extends from the flow passage opening 22 to the end edge on the bottom side of the recess inner wall surface 23a. The valve seat contact part 25a is in contact with the main body contact surface 23b and is formed to have an annular shape surrounding the entire circumference of the flow passage opening 22.

The main body contact surface 23b includes the surface of a portion in direct contact with the valve seat contact part 25a and the surface of a surrounding portion constituting one surface that continues from the foregoing surface. Hence, a range in which the valve seat contact part 25a is projected onto a projection plane that is orthogonal to the reference direction S is included in a range in which the main body contact surface 23b is projected onto the foregoing projection plane.

The holder 29 includes a substantially cylindrical inner circumferential surface 29a. The valve seat section 25 includes a radial load receiving part 25d which is in contact with the inner circumferential surface 29a and which is subjected to a load applied by the inner circumferential surface 29a to the valve seat section 25 in a direction that is orthogonal to the reference direction S.

At least a part of the range in which the valve seat contact part 25a is projected onto the projection plane that is orthogonal to the reference direction S is included in a range in which the valve seat load receiving part 32 is projected onto the projection plane. The valve seat surface in the valve seat section 25 that is in contact with the valve body 26 and the main body contact surface 23b are both formed as the surfaces on planes that are substantially orthogonal to the reference direction S.

Figure 3:
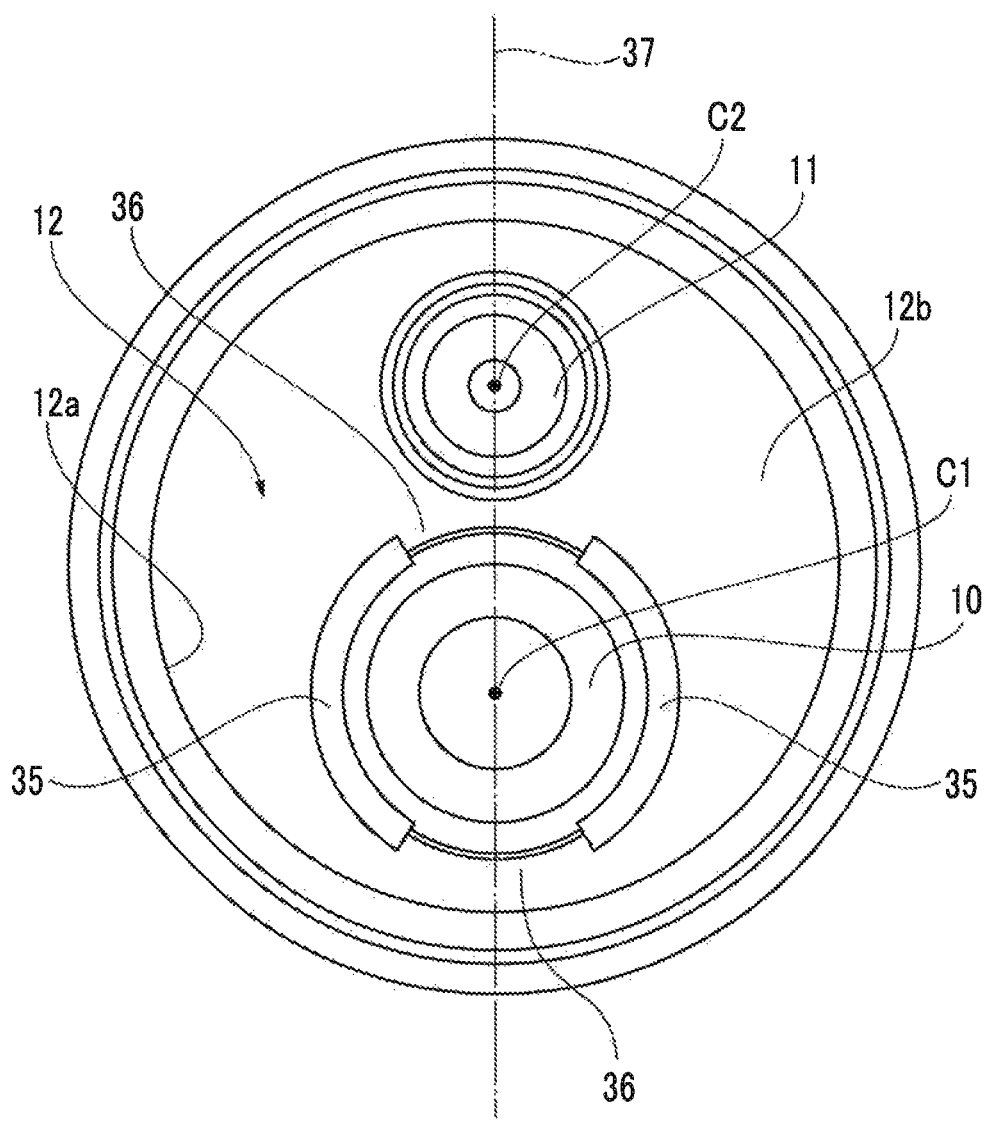
FIG. 3 is a diagram illustrating a large-diameter recess in the high-pressure fuel pump of FIG. 1, which is observed from the opening side thereof.

FIG. 3 illustrates the large-diameter recess 12 observed from the opening side thereof in the reference direction S. As illustrated in FIG. 3, on the bottom surface 12b of the large-diameter recess 12, the deformed fixing parts 35 are formed at a plurality of places, e.g. two places, with equal intervals on the circumference around the central axis 17 of the discharge valve unit 10.

Non-deformed parts 36, which are portions other than the deformed fixing parts 35 on the circumference of the main body 3 (the portions between the deformed fixing parts 35 that are adjacent to each other), intersect with a valve placement direction plane 37, which passes through centers C1 and C2 of the discharge valve unit 10 and the relief valve 11, respectively, and which is parallel to the extending direction of the discharge communication passage 9.

More specifically, the non-deformed parts 36 intersect with the valve placement direction plane 37 between the centers C1 and C2 of both the discharge valve unit 10 and the relief valve 11 as observed in the extending direction, i.e. on the relief valve 11 side than the discharge valve unit 10. The center C1 is the center of a portion where the valve body 26 of the discharge valve unit 10 and the valve seat 25e are in contact with each other. The center C2 is the center of a portion where the valve body 19 of the relief valve 11 and the valve seat member 20 are in contact with each other.

The plurality of deformed fixing parts 35 are formed to be plane-symmetrical, with the valve placement direction plane 37 being the plane of symmetry. Hence, the non-deformed parts 36 intersect with the valve placement direction plane 37 also on the opposite side from the direction toward the relief valve 11 from the center C1 of the discharge valve unit 10, i.e. on the opposite side than the discharge valve unit 10 with respect to the relief valve 11.

The discharge valve unit 10 and the relief valve 11 are incorporated into the main body 3 as described below. For the discharge valve unit 10, first, the valve seat section 25, the valve body 26, the spring member 28 and the holder 29, which are arranged according to the mutual positional relationship illustrated in FIG. 2, are inserted into the small-diameter recess 23 until the valve seat contact part 25a of the valve seat section 25 comes in contact with the main body contact surface 23b of the small-diameter recess 23.

Then, the deformed fixing parts 35 are formed by a cylindrical jig J, which has an inside diameter that is approximately equal to the outside diameter of the holder 29 and which has the distal end portion thereof shaped to correspond to the deformed fixing parts 35.

More specifically, on the outer circumference of the holder 29, the jig J is placed at the positions in the circumferential direction that correspond to the deformed fixing parts 35 of FIG. 3. Then, the portion around the small-diameter recess 23 in the bottom surface 12b of the large-diameter recess 12 is pressed by the distal end surface of the jig J in the direction of the central axis 17, thereby being plastically deformed. Thus, the deformed fixing parts 35 which have the sectional shape illustrated in FIG. 2 and which are arranged as illustrated in FIG. 3 are formed. This completes the incorporation of the discharge valve unit 10.

In the process of forming the deformed fixing parts 35, the plastic deformation is not carried out on and around the valve placement direction plane 37, so that the occurrence of distortion of the main body 3 is controlled to a minimum. Hence, no significant influences are exerted on the passage part 18 of the relief passage 16 by the formation of the deformed fixing parts 35.

For the relief valve 11, first, the spring member 21 is inserted into the passage part 18 of the relief passage 16. Then, with the valve body 19 placed between the spring member 21 and the valve seat member 20, the valve seat member 20 is press-fitted into the passage part 18. At this time, the press-fitting amount is adjusted such that a predetermined valve opening pressure is obtained. Thus, the incorporation of the relief valve 11 is completed.

The valve opening pressure is set to release a high pressure without difficulty by the relief valve 11 in the case where such a high pressure occurs in the high-pressure passage 8 due to some reason and cannot be controlled by the foregoing intake valve provided on the upstream side of the compression chamber 2.

In the high-pressure fuel pump 1 in which the discharge valve unit 10 and the relief valve 11 have been incorporated as described above, when the plunger 14 performs the reciprocating movement as the engine is driven, the foregoing intake valve opens and the fuel comes into the compression chamber 2 when the plunger 14 moves down. Further, when the plunger 14 moves up, the intake valve closes and the fuel in the compression chamber 2 is compressed.

Thus, the pressure inside the compression chamber 2 becomes high, so that the discharge valve unit 10 opens, thus discharging the high-pressure fuel into the high-pressure passage 8. The discharged fuel is injected from the injector via the high-pressure passage 8. Meanwhile, if the pressure in the high-pressure passage 8 becomes excessively high for some reason, then the relief valve 11 opens, causing the high-pressure fuel in the high-pressure passage 8 to be released into the damper chamber 6 through the relief passage 16.

The relief valve 11 is adapted to function as a safety device that mechanically releases the pressure in the high-pressure passage 8 if the pressure becomes excessively high. Therefore, the valve opening pressure is required to be accurately maintained. In this respect, when the discharge valve unit 10 is incorporated as described above, the influences of the plastic deformation of the main body 3 are hardly exerted on the relief passage 16, so that the valve opening pressure of the relief valve 11 is accurately maintained.

As described above, according to the present embodiment, the discharge valve unit 10 can be unitized and fixed to the main body 3 at the same time merely by inserting the valve seat section 25, the valve body 26, the spring member 28 and the holder 29 into the small-diameter recess 23 of the main body 3 without the need for unitizing these constituent elements in advance, and by providing the deformed fixing parts 35 (by carrying out the crimping process).

Thus, the discharge valve unit 10 can be fixed to the main body 3 by reduced man-hours, making it possible to provide an inexpensive valve unit fixing structure. Further, there is no need to press-fit the discharge valve unit 10 into the small-diameter recess 23 of the main body 3, thus eliminating the need for high dimensional accuracy for controlling the tightening margins required for press-fitting.

Further, the load for fixing the discharge valve unit 10 is concentrated on the valve seat contact part 25a, which is formed in the annular shape, so that even if the surface of the valve seat contact part 25a and the main body contact surface 23b that comes in contact with the valve seat contact part 25a have high surface roughness, the microscopic asperities of the surfaces are smoothed out. This makes it possible to maintain high sealability between the valve seat section 25 and the main body 3.

Further, the radial load which is generated when fixing (crimp fixing) by the deformed fixing parts 35 and which is applied by the deformed fixing parts 35 to the holder load receiving part 34 can be received by the valve seat section 25. This enables the holder 29 to be formed to have a thinner wall, thus making it possible to achieve a smaller, lighter-weight valve unit fixing structure.

Further, a part of the range in which the valve seat contact part 25a is projected onto the projection plane that is orthogonal to the reference direction S is included in the range in which the valve seat load receiving part 32 is projected onto the projection plane. Hence, the load applied to the valve seat load receiving part 32 is linearly transmitted to the valve seat contact part 25a. In addition, the main body contact surface 23b and the valve seat surface of the valve seat section 25 are both formed as the surfaces on the planes that are substantially orthogonal to the reference direction S.

Therefore, the possibility of the occurrence of a bending stress inside the valve seat section 25 is minimized, and the valve seat surface of the valve seat section 25 maintains the state in which the valve seat surface is substantially orthogonal to the reference direction S. This makes it possible to maintain the flatness of the valve body 26 which comes in contact with the valve seat surface.

Further, the deformed fixing parts 35 do not intersect with the valve placement direction plane 37 between the centers C1 and C2 of both the discharge valve unit 10 and the relief valve 11, respectively. Hence, the deformed fixing parts 35 and the relief valve 11 are farther apart from each other, as compared with a case where there is the foregoing intersection.

This arrangement makes it possible to prevent, to a maximum, the distortion which has occurred on the main body 3 due to the formation of the deformed fixing parts 35, from being transmitted to the relief valve 11. In other words, the relief valve 11 can be placed closer to the discharge valve unit 10, thus enabling the high-pressure fuel pump 1 to be made smaller.

Further, when the discharge valve unit 10 and the relief valve 11 are inserted into the interior of the large-diameter recess 12 to fix the discharge valve unit 10 and the relief valve 11 to the main body 3, even if the distance therebetween is small, the distortion of the main body 3 caused by the formation of the deformed fixing parts 35 can be prevented from being transmitted to the relief valve 11. Hence, the distance between the discharge valve unit 10 and the relief valve 11 can be reduced and the large-diameter recess 12 can be set to be smaller, thus enabling the main body 3 to be made even smaller.

Further, if the discharge valve unit 10 were to be brought close to the inner wall surface 12a of the large-diameter recess 12 to the utmost limit, then it could be extremely difficult to plastically deform the area between the inner wall surface 12a and the discharge valve unit 10. However, the parts where the discharge valve unit 10 and the inner wall surface 12a are closest to each other are the non-deformed parts 36, which are not plastically deformed.

Thus, the discharge valve unit 10 can be fixed to the main body 3 in good balance, and the relief valve 11 can be also placed in the large-diameter recess 12, which is small, so that the high-pressure fuel pump 1 can be made even smaller.

Further, as described above, the possibility of the transmission of the distortion caused by the formation of the deformed fixing parts 35 to the relief passage 16 is minimized, so that even when the valve seat member 20 of the relief valve 11 is directly press-fitted into the relief passage 16 of the main body 3 and the valve seat member 20 is fixed therein, the sealability between the valve body 26 and the seat surface of the valve seat member 20 can be maintained. Thus, the number of components for constituting the relief valve 11 can be reduced.

Further, since the valve seat member 20 is not displaced by the distortion of the deformed fixing parts 35, the amount of compression of the spring member 21 can be prevented from changing, thus making it possible to accurately control the valve opening pressure of the relief valve 11.

Figure 4:
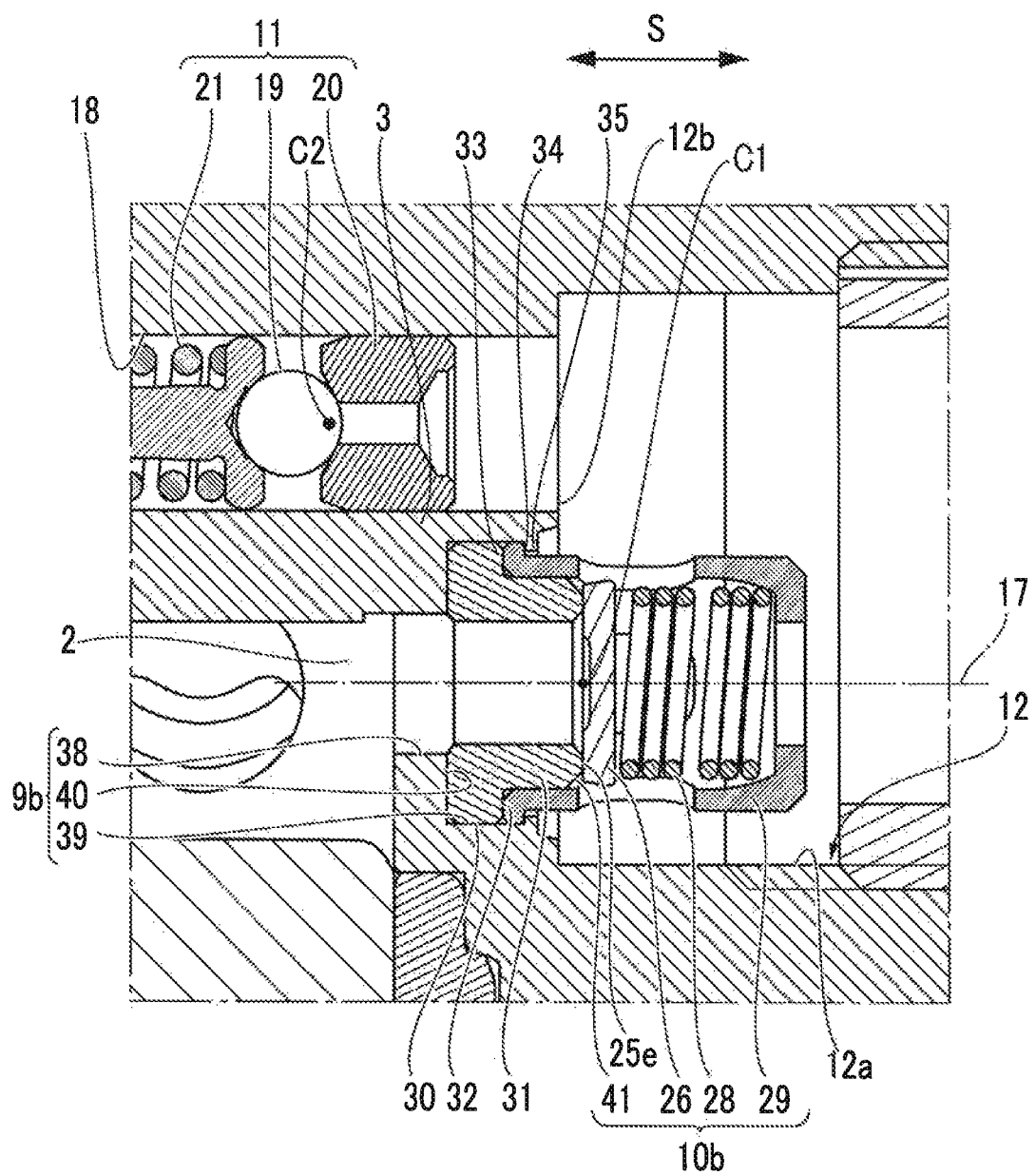
FIG. 4 is a sectional view illustrating a discharge valve unit of a high-pressure fuel pump according to another embodiment of the present invention.

FIG. 4 illustrates an essential section of a high-pressure fuel pump according to another embodiment. In this high-pressure fuel pump, the shapes of a discharge communication passage and a valve seat section differ from those of the embodiment of FIG. 1 and FIG. 2. More specifically, in the high-pressure fuel pump according to the present embodiment, a discharge communication passage 9b extending from a compression chamber 2 to a high-pressure passage 8 has a small-inside-diameter part 38 adjacent to the downstream side of the compression chamber 2, a large-inside-diameter part 39 which is positioned on the downstream side of the small-inside-diameter part 38 and which has a larger inside diameter than the small-inside-diameter part 38, and a main body contact surface 40 which connects the small-inside-diameter part 38 and the large-inside-diameter part 39 in a stepwise manner, as illustrated in FIG. 4. The downstream side of the large-inside-diameter part 39 opens to a bottom surface 12b of a large-diameter recess 12.

As with the case of the foregoing valve seat section 25 of FIG. 2, a valve seat section 41 of a discharge valve unit 10b has a large-outside-diameter part 30 on the upstream side, a small-outside-diameter part 31 which has a smaller outside diameter than the large-outside-diameter part 30 and which is on the downstream side, and a valve seat load receiving part 32 which connects the large-outside-diameter part 30 and the small-outside-diameter part 31 in a stepwise manner. However, unlike the case of the foregoing valve seat section 25 of FIG. 2, the end surface on the upstream side of the valve seat section 41 is in contact with substantially the entire surface of the main body contact surface 40. The rest of the configuration is the same as that of the high-pressure fuel pump 1 of FIG. 1 and FIG. 2.

Figure 5:
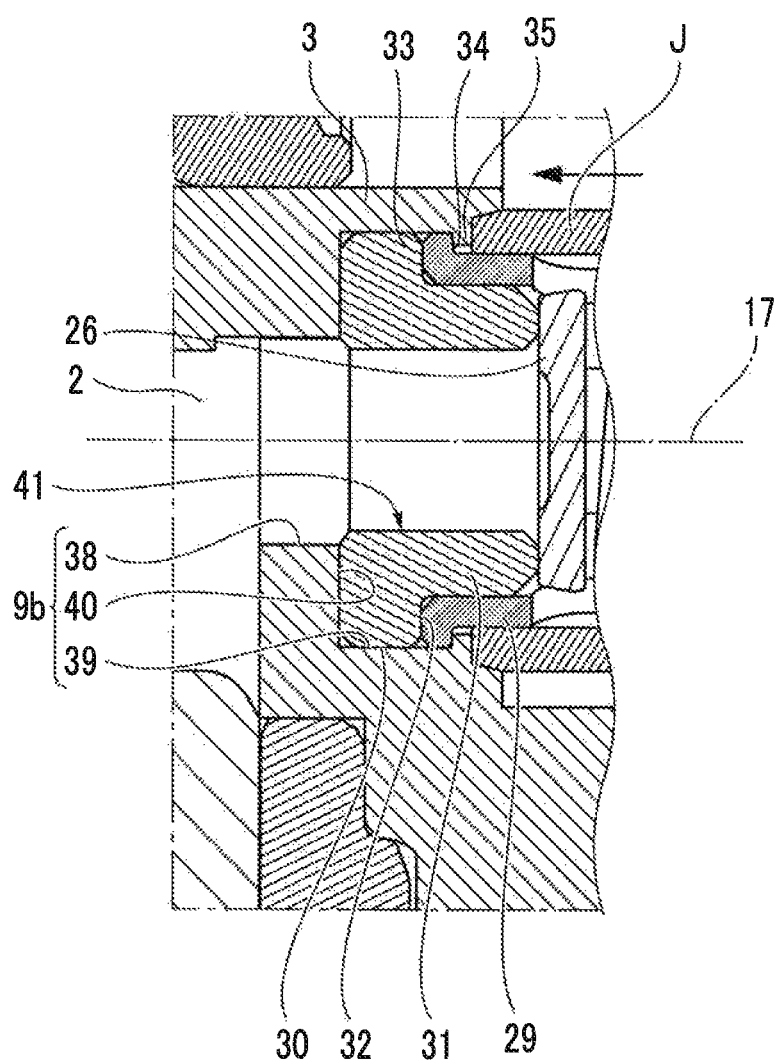
FIG. 5 is a sectional view illustrating the formation of deformed fixing parts for fixing the discharge valve unit in the high-pressure fuel pump of FIG. 4.

In the case of the present embodiment also, the discharge valve unit 10b can be incorporated in the main body 3 in the same manner as that in the case of the discharge valve unit 10 of FIG. 2. More specifically, as illustrated in FIG. 5, the discharge valve unit 10b is inserted until the end surface on the upstream side of the valve seat section 41 comes in contact with the main body contact surface 40 of the discharge communication passage 9b, and deformed fixing parts 35 are formed by a jig J. This enables the discharge valve unit 10b to be easily incorporated in the main body 3.

The effects provided by the present embodiment are the same as those of the discharge valve unit 10 except for the effect related to the valve seat contact part 25a in the foregoing discharge valve unit 10 of FIG. 2.

The present invention is not limited to the foregoing embodiments. For example, the present invention can be applied to a valve unit other than a discharge valve unit.

Figure 6:
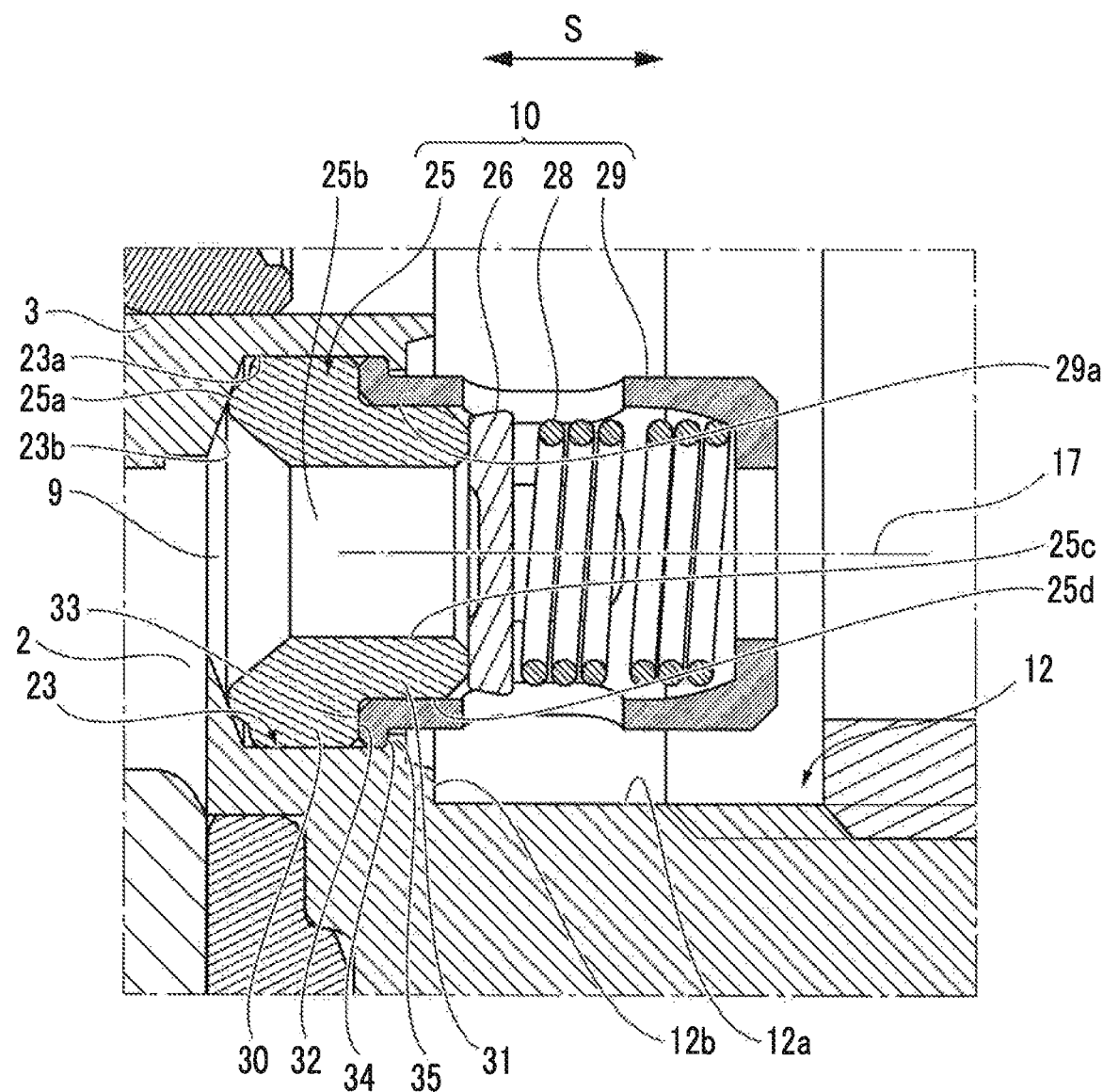
FIG. 6 is a sectional view illustrating a modified example of the discharge valve unit in the high-pressure fuel pump of FIG. 1.

Further, as illustrated in FIG. 6, the main body contact surface 23b and the valve seat contact part 25a do not have to be perpendicular to the reference direction S and may not be parallel to each other. In this case also, the range in which the valve seat contact part 25a is projected onto the projection plane that is orthogonal to the reference direction S is included in the range in which the main body contact surface 23b is projected onto the projection plane, so that the high sealability between the valve seat section 25 and the main body 3 can be maintained.

Further, in this case, because of the curvature of the sectional shape of the valve seat contact part 25a in contact with the main body contact surface 23b, the main body contact surface 23b is in contact with the valve seat contact part 25a in a smaller area. Hence, in this case, even higher sealability between the valve seat section 25 and the main body 3 can be maintained.

Further, the present invention is not limited to the case where the central axes of a discharge valve and a relief valve are parallel to each other, but can be applied also to a case where the central axes of a discharge valve and a relief valve are not parallel to each other. In other words, in such a case also, the effects of the present invention can be provided insofar as non-deformed parts intersect with a valve placement direction plane which passes through the centers of both the discharge valve and the relief valve and which is parallel to the extending direction of a discharge communication passage.

DESCRIPTION OF REFERENCE NUMERALS

1 . . . high-pressure fuel pump; 2 . . . compression chamber; 3 . . . main body; 4 . . . intake pipe; 5 . . . pulsation damper; 6 . . . damper chamber; 7 . . . intake port; 8 . . . high-pressure passage; 9, 9b . . . discharge communication passage; 10, 10b . . . discharge valve b unit; 11 . . . relief valve; 12 . . . large-diameter recess; 12a . . . inner wall surface; 12b . . . bottom surface; 13 . . . high-pressure connection part; 14 . . . plunger; 15 . . . spring; 16 . . . relief passage; 17 . . . central axis; 18 . . . passage part; 19 . . . valve body; 20 . . . valve seat member; 21 . . . spring member; 22 . . . flow passage opening; 23 . . . small-diameter recess; 23a . . . recess inner wall surface; 23b . . . main body contact surface; 25, 41 . . . valve seat section; 25a . . . valve seat contact part; 25b . . . inner flow passage; 25c . . . valve seat inner wall surface; 25d . . . radial load receiving part; 25e . . . valve seat; 26 . . . valve body; 28 . . . spring member; 29 . . . holder; 29a . . . inner circumferential surface; 30 . . . large-outside-diameter part; 31 . . . small-outside-diameter part; 32 . . . valve seat load receiving part; 33 . . . holder contact part; 34 . . . holder load receiving part; 35 . . . deformed fixing part; 36 . . . non-deformed part; 37 . . . valve placement direction plane; 38 . . . small-inside-diameter part; 39 . . . large-inside-diameter part; 40 . . . main body contact surface; J . . . jig; and S . . . reference direction.

What is claimed is:

1. A valve unit fixing structure comprising:
a main body;
a main body flow passage which is provided in the main body and through which a fluid passes;
a valve unit which is provided in the main body and which opens/closes the main body flow passage, and
a deformed fixing part which is formed by plastically deforming the main body and which fixes the valve unit to the main body;
wherein the main body includes a recess which is in communication with the main body flow passage and which extends in a reference direction,
the valve unit includes:
a valve seat section having a valve seat;
a valve body which comes in contact with the valve seat to close the main body flow passage;
a spring member which urges the valve body toward the valve seat section; and
a holder which accommodates the spring member,
wherein the valve unit is fixed to the main body by at least a part of the valve unit being inserted in the recess in the reference direction,
the valve seat section includes:
a valve seat contact part which comes in contact with the main body in the reference direction; and
a valve seat load receiving part which receives load in the reference direction applied by the holder which comes in contact therewith, the holder applying the load to the valve seat section,
the holder includes:
a holder contact part which comes in contact with the valve seat load receiving part; and
a holder load receiving part which receives load in the reference direction applied by the main body to the holder, and
the deformed fixing part fixes the valve unit to the main body by applying the load in the reference direction to the holder.

2. The valve unit fixing structure according to claim 1, wherein the valve seat section includes a substantially cylindrical valve seat inner wall surface which forms at least a part of an inner flow passage which is connected to the main body flow passage and through which the fluid passes,
the recess includes:
a recess inner wall surface that extends in parallel to the reference direction;
a flow passage opening that is a part in which the main body flow passage opens to the recess; and
a main body contact surface which extends from the flow passage opening to an end edge of the recess inner wall surface, the end edge being adjacent to the flow passage opening,
the valve seat contact part is in contact with the main body contact surface,
a range in which the valve seat contact part is projected onto a projection plane that is orthogonal to the reference direction is included in a range in which the main body contact surface is projected onto the projection plane, and
the valve seat contact part is formed in an annular shape that encloses the entire circumference of the flow passage opening.

3. The valve unit fixing structure according to claim 1, wherein the holder includes a substantially cylindrical inner circumferential surface, and
the valve seat section includes a radial load receiving part which comes in contact with the inner circumferential surface and receives load applied to the valve seat section by the inner circumferential surface in a direction that is orthogonal to the reference direction.

4. The valve unit fixing structure according to claim 1, wherein the at least a part of the range in which the valve seat contact part is projected onto a projection plane that is orthogonal to the reference direction is included in a range in which the valve seat load receiving part is projected onto the projection plane, and a valve seat surface of the valve seat section that comes in contact with the valve body and the main body contact surface where the main body comes in contact with the valve seat contact part are both formed as the surfaces on planes that are substantially orthogonal to the reference direction.

5. A fluid pump including a pump main body having a compression chamber for drawing in a fluid, increasing the pressure of the fluid and then discharging the fluid, the pump main body being provided with a plurality of fluid valves, a high-pressure passage through which a fluid discharged from the compression chamber passes, and a discharge communication passage extending from the compression chamber to the high-pressure passage, and a valve unit fixing structure; wherein the valve unit fixing structure comprises,
a main body,
a main body flow passage which is provided in the main body and through which a fluid passes,
a valve unit which is provided in the main body and which opens/closes the main body flow passage, and
a deformed fixing part which is formed by plastically deforming the main body and which fixes the valve unit to the main body;

the main body of the valve unit fixing structure constitutes the pump main body;

the main body flow passage of the valve unit fixing structure constitutes the discharge passage;

at least one of the fluid valves is a discharge valve provided in the discharge communication passage as a valve unit of the valve unit fixing structure;

at least another one of the fluid valves is a relief valve provided between the high-pressure passage and a space having a lower pressure than the high-pressure passage;

the discharge valve is fixed to the pump main body by the deformed fixing part of the valve unit fixing structure;

the deformed fixing part is evenly disposed about the discharge valve at a plurality of places in the circumferential direction; and a non-deformed part, which is a part between the deformed fixing parts that are adjacent to each other in the pump main body, intersects, on the relief valve side than the discharge valve, with a valve placement direction plane which passes through the center of the discharge valve and the center of the relief valve and which is parallel to a direction in which the discharge communication passage extends.

6. The fluid pump according to claim 5, wherein the pump main body is provided with a single recess which has a substantially cylindrical inner wall surface and which forms at least a part of the high-pressure passage, and the discharge valve and the relief valve are inserted through the interior enclosed by the inner wall surface of the recess and fixed to the pump main body.

7. The fluid pump according to claim 5, wherein the plurality of deformed fixing parts are plane-symmetrical, using the valve placement direction plane as the plane of symmetry, and the non-deformed part intersects with the valve placement direction plane also on the opposite side than the discharge valve with respect to the relief valve.

8. The fluid pump according to claim 5, wherein the pump main body is provided with a relief passage in communication with the low-pressure space from the high-pressure passage, and the relief valve includes:
a valve body;
a valve seat member which is press-fitted into the relief passage and which collaborates with the valve body, and
a spring member which is inserted in the relief passage and compressed by press-fitting of the valve seat member and which urges the valve body toward the valve seat member.

* * * * *